United States Patent [19]
Kato et al.

[11] Patent Number: 5,087,600

[45] Date of Patent: Feb. 11, 1992

[54] PROCESS FOR PRODUCING A CATALYST FOR DENITRATION BY CATALYTIC REDUCTION USING AMMONIA

[75] Inventors: Yasuyoshi Kato; Kunihiko Konishi; Hiroshi Akama; Toshiaki Matsuda; Nobue Teshima, all of Kure, Japan

[73] Assignee: Babcock-Hitachi Kabushiki Kaisha, Tokyo, Japan

[21] Appl. No.: 589,452

[22] Filed: Sep. 27, 1990

Related U.S. Application Data

[63] Continuation of Ser. No. 201,536, Jun. 2, 1988, Pat. No. 4,966,882.

[51] Int. Cl.$^5$ .................. B01J 21/06; B01J 23/14; B01J 23/28; B01J 23/30
[52] U.S. Cl. .................. 502/309; 502/324; 502/338; 502/345; 502/350
[58] Field of Search ............... 502/309, 324, 338, 345, 502/350

[56] References Cited

U.S. PATENT DOCUMENTS

| | | | |
|---|---|---|---|
| 4,085,193 | 4/1978 | Nakajima et al. | 502/309 |
| 4,466,947 | 8/1984 | Imanari et al. | 502/309 |
| 4,833,113 | 5/1989 | Imanari et al. | 502/309 |

FOREIGN PATENT DOCUMENTS

| | | | |
|---|---|---|---|
| 2617744 | 11/1976 | Fed. Rep. of Germany | 502/309 |
| 3634335 | 4/1988 | Fed. Rep. of Germany | 502/309 |
| 58-183946 | 10/1983 | Japan | 502/309 |

*Primary Examiner*—W. J. Shine
*Attorney, Agent, or Firm*—Fay, Sharpe, Beall, Fagan, Minnich & McKee

[57] ABSTRACT

A catalyst for denitration by catalytic reduction using ammonia capable of preventing catalyst deterioation due to vapors of heavy metal compounds contained in exhaust gases and having a high strength and a superior resistance to poisons and a process for producing the catalyst are provided, which catalyst comprises $TiO_2$, oxide(s) of at least one of V, Cu, Fe and Mn and oxide(s) of at least one of Mo, W and Sn, the total of the mol number(s) of the oxide(s) of at least one of Mo, W and Sn falling within a range of $2 \times 10^{-6}$ to $20 \times 10^{-6}$ mol/m$^2$ per the unit specific surface of the catalyst, and which process comprises having oxide(s) of at least one of Mo, W and Sn adsorbed and supported onto a composition comprising $TiO_2$ prepared in advance and oxide(s) of at least one of V, Fe, Cu and Mn so as to give the above-specified total of the mol number(s) of oxide(s) of at least one of Mo, W and Sn.

8 Claims, 3 Drawing Sheets

PROCESS FOR PRODUCING A CATALYST FOR DENITRATION BY CATALYTIC REDUCTION USING AMMONIA

This is a continuation of copending Ser. No. 201,536 filed June 2, 1988, now U.S. Pat. No. 4,966,882.

BACK GROUND OF THE INVENTION

1. Field of the Invention

This invention relates to a catalyst for denitration by catalytic reduction using ammonia and a process for producing the catalyst. More particularly, it relates to a denitration catalyst suitable for denitrating exhaust gases containing a large quantity of heavy metal oxides.

2. Description of the Related Art

Nitrogen oxides (NOx) exhausted from various fixed NOx - generating sources are a main air pollutant together with sulfur oxides (SOx) As to the process for removing this NOx, there are various processes, and among these, a process of selectively reducing NOx with ammonia added to exhaust gases in the presence of a catalyst has been constituting the main current of the processes. It is required for this catalyst for denitration by catalytic reduction using ammonia to be not degenerated by SOx and ashes contained in exhaust gases generated by combustion of fossil fuel such as petroleum, coal, etc., and for satisfying this requirement, various catalysts based on titanium oxide have been invented and now broadly practically used (Japanese patent application liquid-open Nos. Sho 50-128681/1975, Sho 53-28148/1978, etc.).

These catalysts are prepared by adding oxides of transition metal elements such as vanadium, molybdenum, tungsten, iron, chromium, etc. to metatitanic acid or titanium oxide by means of kneading, impregnation or the like, followed by calcination, and have superior activity and life to usual catalysts for denitration of exhaust gases from a combustion apparatus of petroleum, coal, etc.

However, in the case where exhaust gases containing a large quantity of vapors of heavy metal oxides such as combustion exhaust gases from low quality coal, exhaust gases from boilers having an ash-circulating line, etc. are treated, a problem of reduction in the catalyst activity has not been taken into consideration. In particular, in the case of a combustion system having an ash-circulating line 9 as shown in FIG. 5, metals contained in mineral substances of coal such as lead (Pb), selenium (Se), arsenic (As), cadmium (Cd), zinc (Zn), etc. are transferred into exhaust gases in the form of vapor of single substances or oxides during the process wherein ashes are molten in a furnace 1 and recovered in the form of slug, and are present in the form of a high concentration of metal vapors upstream of an air preheater 6 usually provided with a denitration means (see H. Brumsack et al., Environmetal Technology Letters; 5, 7-22 (1984)), and it has raised a problem that the denitration catalyst is poisoned by these vapors (see Shokubai, 29, 36-37 (1987)).

Further, the above-mentioned prior art has given no adequate consideration to the catalyst strength, particularly to the hardwearing strength of the catalyst due to ash particles contained in exhaust gases.

SUMMARY OF THE INVENTION

A first object of the present invention is to provide a catalyst which is prevented from its deterioration due to vapors of heavy metal compounds contained in exhaust gases.

A second object of the present invention is to provide a process for producing a catalyst having overcome the drawbacks of the above-mentioned prior art and having a high strength and a superior resistance to poisons with a simple process.

The above first object is achieved by having an oxide or oxides of at least one element selected from among molybdenum (Mo), tungsten (W) and tin (Sn) adsorbed and supported onto a composition composed mainly of titanium oxide and an oxide or oxides of at least one element selected from among vanadium (V), copper (Cu), iron (Fe) and manganese (Mn) in specified proportions.

The above specified proportions of the metal oxides are achieved by imparing the catalyst so that the content of Mo, W or Sn per the specific surface area of the catalyst at the state where the catalyst is used can satisfy the following relationship:

$$2 \times 10^{-6} \leq M/SA \leq 20 \times 10^{-6}$$

wherein M represents the number of mol (mol/g) of Mo, W or Sn per unit weight of catalyst and SA represents the specific surface area of catalyst (m²/g).

Namely, the present invention resides in;

a catalyst for denitration comprising titanium oxide, an oxide or oxides of at least one element selected from the group consisting of vanadium, copper, iron and manganese and an oxide or oxides of at least one element selected from the group consisting of molybdenum, tungsten and tin, the total of the mol number(s) of said oxide or oxides of at least one element selected from the group consisting of molybdenum, tungsten and tin falling within a range of $2 \times 10^{-6}$ to $20 \times 10^{-6}$ mol/m² per the specific surface area of said catalyst.

Further, the present invention resides in;

a process for producing a catalyst for denitration which comprises having an oxide or oxides of at least one element selected from the group consisting of molybdenum, tungsten and tin adsorbed and supported onto a composition comprising titanium oxide prepared in advance and an oxide or oxides of at least one element selected from the group consisting of vanadium, iron, copper and manganese so that the total of the mol number(s) of said oxide or oxides of at least one element selected from the group consisting of molybdenum, tungsten and tin can fall within a range of $2 \times 10^{-6}$ to $20 \times 10^{-6}$ mol/m² per the specific surface area of said catalyst.

The above-mentioned second object of the present invention is achieved by;

a process for producing a catalyst for denitration which comprises adding a compound or compounds of at least one element selected from the group consisting of vanadium (V), iron (Fe), copper (Cu) and manganese (Mn) to titanic acid, kneading and drying the mixture, threafter calcining it at a temperature of 300° to 600° C., adding molybdenum trioxide (MoO3) to the calcined material, wet-kneading it, molding the kneaded material into a definite shape, drying the molded material and calcining it at a temperature of 400° to 600° C.

DETAILED DESCRIPTION OF PREFERRED EMBODIMENTS

Figure 1:
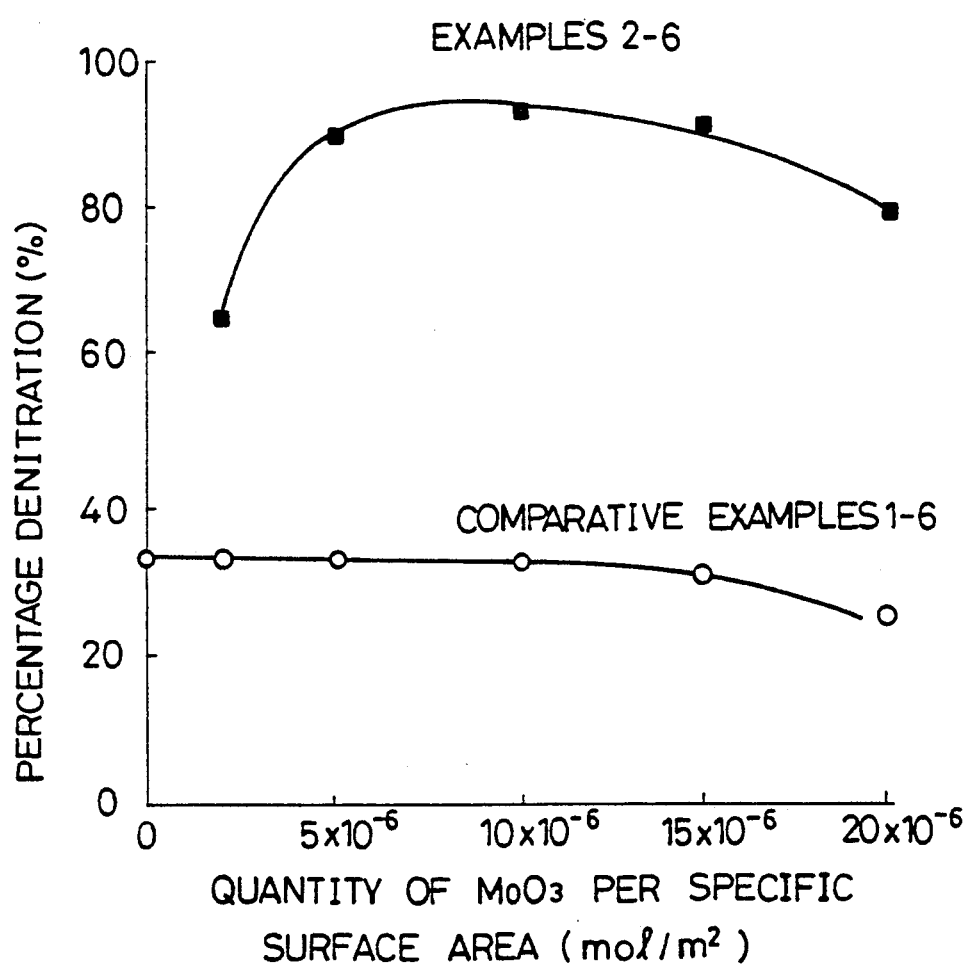
FIG. 1 shows a chart illustrating the relationship between the change in quantity of MoO₃ per specific surface area and percentage denitration in Examples 2-6 of the present invention.

It is considered that conventional titanium catalysts are activated by adsorption of sulfate group onto the catalysts and when vapors of heavy metal compounds are contacted therewith, activity reduction occurs by replacement of the sulfate group by the compounds.

Whereas, in the case of the catalyst of the present invention, it is considered that the oxide(s) of at least one of Mo, W and Sn on the catalyst play a role of activating the catalyst in place of sulfate group, and even when the oxide(s) are contacted with vapors of heavy metal compounds, the adsorbed molecules of the oxides) of at least one of Mo, W and Sn are not replaced by vapors of heavy metal compounds unlike sulfate group; hence no activity reduction occurs.

The catalyst of the present invention is produced basically by having the oxide(s) of at least one of Mo, W and Sn adsorbed and supported onto a catalyst composed of titanium oxide and oxide(s) of at least one element selected from among V, Fe, Mn and Cu, concretely, the catalyst is produced by adding compound(s) of at least one of V, Cu Fe and Mn to titanic acid or titanium oxide in a conventional manner such as kneading, impregnation or the like, followed by making up the resulting material into a catalyst through steps such as drying, calcination, molding, etc., and then contacting the catalyst with a gas containing vapor(s) of the oxide(s) of at least one of molybdenum trioxide ($MoO_3$), molybdenic acid ($H_2MoO_4$), tungsten trioxide ($WO_3$) and tin oxide to thereby have the metal oxide(s) adsorbed thereonto.

The atomic ratio of at least one of vanadium, copper, iron and manganese to at least one of molybdenum, tungsten and tin in the catalyst of the present invention is preferably in the range of 1/10 to 4/10.

The above-mentioned adsorption process of the oxide(s) of at least one of Mo, W and Sn by using the vapor(s) of these metal may be replaced by contacting the above-mentioned catalyst with vapor(s) of alkyl compound(s), alkoxide(s) or the like containing at least one of these metals and forming the oxide(s) thereof during the preparation of the catalyst. Further, a process may comprise a step of adding the compound(s) of at least one of Mo, W and Sn to the catalyst.

At its preparation step in advance, followed by calcining the resulting mixture at a high temperature at which the vapor pressure of the oxide(s) of at least one of Mo, W and Sn is elevated, may also be employed. Still further, the above-mentioned catalyst may be impregnated with the compound(s) of at least one of Mo, W and Sn, followed by treating the resulting material at a high temperature as described above. As to the treating temperature in this case, for example, a range of 450° to 650° C. particularly 500° to 600° C. is preferred in the case of the compound of Mo, and a range of 500° to 750° C. is preferred in the case of the compound of W, in order to obtain an adequate vapor pressure of the oxide thereof.

When the content of at least one of Mo, W and Sn is in the range of 0.2 to 2.0% in terms of the percentage coating assuming that these metal components are adsorbed on the catalyst to form a monomolecular layer, i.e. in the range of $2 \times 10^{-6}$ mol/m$^2$ to $20 \times 10^{-6}$ mol/m$^2$ in terms of the mol number per the specific surface area, then the effectiveness of preventing the catalyst deterioration due to heavy metal vapors and the denitration activity are both enhanced. If the above-mentioned mol number is less than $2 \times 10^{-6}$, the catalyst performance is notably reduced, while if it is larger than $20 \times 10^{-6}$, the initial catalyst performance is inferior.

The preferred range of the mol number per the specific surface area of the catalyst is $5 \times 10^{-6}$ to $15 \times 10^{-6}$ mol/m$^2$.

The catalyst of the present invention, after subjected to the above-mentioned treatment, may be molded into a predetermined shape, for example a honeycomb or a tablet, or coated onto a metal plate to form a catalyst plate. The above-mentioned treatment may be applied after molding of the catalyst. Further, when the catalyst is molded or formed, various auxiliaries, reinforcing agents such as inorganic fibers or binders may be added to the catalyst.

Figure 2:
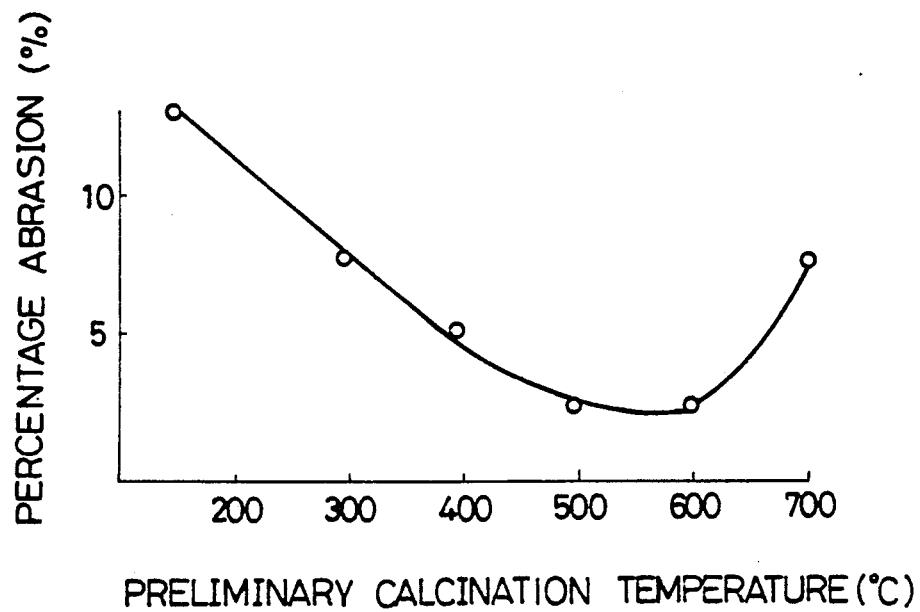
FIG. 2 shows a chart illustrating relationship between the change in the preliminary calcination temperature and percentage denitration in Example 16 of the present invention.

According to the present invention, it is possible to subject exhaust gases, for example those from a combustion apparatus like a boiler having an ash-circulating line as shown in FIG. 2, to denitration treatment, which has been difficult to realize for conventional catalysts due to notable reduction in the activity, with a simplicity and using the same amount of catalyst as that of conventional denitration.

In the production process of the catalyst for achieving the second object of the present invention, an active element of V, etc. is adsorbed onto metatitanic acid in the first step and then calcined, whereby it is highly dispersed on $TiO_2$ to form highly active sites. Further, since dehydration and sintering at low temperatures are completed by the calcination, occurrence of cracks and reduction in the strength due to shrinkage of the resulting molded products by the calcination are prevented.

By wet-kneading the catalyst component and $MoO_3$ at the second step, a portion of the catalyst component forms contact points of $TiO_2$—$TiO_2$ particles and another portion thereof forms a state where it is physically coated by $MoO_3$.

Further, by the high temperature calcination at the third step, $MoO_3$ is dispersed on the titanium oxide catalyst surface. Thereby, the resistance to poison of the catalyst is highly improved.

As described above, according to the process of the present invention, a raw material is prepared in advance under conditions capable of increasing the catalyst activity and the strength, in the first step, and the resulting material is kneaded at the second step, whereby contact points of $TiO_2$—$TiO_2$ particles indispensable for improving the strength are formed to thereby obtain a catalyst having a very high strength.

Further, $MoO_3$ is still in a physically mixed state at the time of molding, but it coats the catalyst surface for the first time at the third step. In the conventional production process, when Mo raw material is added into a metatitanic acid slurry, $MoO_3$ coats the catalyst particle surface to hinder contact of $TiO_2$—$TiO_2$ particles and thereby reduce the catalyst strength. In the present invention, such a problem does not occur.

Furthermore, since $MoO_3$ has been physically uniformly mixed at the second step, it is possible to obtain a uniform and superior molded product of the catalyst as compared with that obtained according to a process of treating a once molded product of catalyst with $MoO_3$ vapor to enhance to its resistance to poison.

Still further, if water-insoluble $MoO_3$ is not used in the present process, but a water-soluble molybdenum compound such as ammonium molybdate is used, the Mo compound intrudes into contact points of $TiO_2$—$TiO_2$ formed at the first step to make it impossible to obtain a catalyst having a high strength. Whereas, when water-insoluble molybdenum oxide is used, no breakage of contact points of $TiO_2$—$TiO_2$ occurs; hence a catalyst having an extremely high strength is obtained.

The present invention will be described in more detail by way of Examples.

EXAMPLE 1

Ammonium metavanadate ($NH_4VO_3$)(25.8 g) was added to a slurry (1 kg) of metatitanic acid having a titanium oxide contant of 30% by weight, followed by kneading the mixture on heating by means of a kneader while vaporizing water to obtain a catalyst paste, thereafter drying this paste at 180° C. for 12 hours, grinding the dried material by means of a hammer mill, calcining the resulting material at 550° C. for 2 hours, press-molding the resulting powder into a material of 13 mm in diameter and 5 mm in length, grinding this material to a particle size of 10 to 20 meshes to obtain Ti/V catalyst, introducing this granular catalyst (50 g) together with molybdenum trioxide ($MoO_3$) (50 g) into a crucible equipped with a lid, keeping the contents at 550° C. for 3 hours to subject the catalyst to deposition treatment with $MoO_3$ vapor, cooling the resulting material down to room temperature and taking out the catalyst granules alone. The quantity of $MoO_3$ adsorbed onto the catalyst was 4.3% by weight as a result of chemical analysis.

COMPARATIVE EXAMPLE 1

Example 1 was repeated except that $MoO_3$ was not introduced into the crucible.

EXAMPLES 2 to 6

A Ti/V catalyst powder was first obtained in the same manner as in Example 1, followed by mixing therewith $MoO_3$ powder in proportions of 2, 5, 10, 15 and 20% by weight by means of a dry mixer, press-molding the resulting respective powders into a material of of 13 mm in diameter and 5 mm in length, grinding it to a particle size of 10 to 20 meshes, introducing the resulting granules into a crucible equipped with a lid and heat-treating the contents at 550° C. for 3 hours.

COMPARATIVE EXAMPLES 2 to 6

Examples 2 to 6 were repeated except that the heat-treating temperature was changed to 400° C.

EXAMPLES 7 to 9

In Example 4, the same mol of copper nitrate, iron nitrate or manganese nitrate was added in place of ammonium metavanadate, followed by the same process as in Example 4 to obtain Ti/Cu, Ti/Fe and Ti/Mn catalysts.

COMPARATIVE EXAMPLES 7 to 9

Examples 7 to 9 were repeated except that no $MoO_3$ deposition was carried out to obtain catalysts.

EXAMPLE 10

In place of $MoO_3$ deposition in Example 1, the catalyst was impregnated with a 30% by weight hydrogen peroxide aqueous solution of ammonium paratungstate so as to give the same mol as that of $MoO_3$, followed by drying the resulting material at 180° C. for 2 hours and then calcining at 700° C. for 2 hours.

EXAMPLES 11 to 14

To a metatitanic acid slurry (50 kg) having a $TiO_2$ content of 30% by weight were added ammonium metavanadate (0 kg, 0.25 kg, 0.50 kg or 1.02 kg) and ammonium molybdate (3.68 kg, 3.72 kg, 3.76 kg or 3.81 kg), followed by kneading the mixture on heating by means of a kneader to obtain a paste having a water content of 34%, molding the paste into a rod shape of 1 mm in diameter by means of an extrusion-granulator, drying it down to a water content of 3% by means of a fluidized bed dryer, grinding the resulting material to a size of 90% or more in terms of 100 mesh pass by means of a hammer mill, preliminarily calcining the resulting powder at 350° C., adding water and kaolin inorganic fibers in 15% by weight to obtain a paste, pressure-applying the paste by means of rolls onto a metal substrate obtained by subjecting a thin plate of SUS 304 of 0.3 mm thick to metal lath processing and then flame-spraying molten aluminium onto the resulting material, air-drying the resulting material for 12 hours and calcining at 550° C. for 2 hours to obtain catalysts.

COMPARATIVE EXAMPLE 10

Example 14 was repeated except that no molybdenum was added, to obtain a catalyst.

EXAMPLE 15

In order to enhance the catalyst strength of the catalyst of Example 14, the catalyst was impregnated with an aqueous solution of aluminum sulfate (concentration: 350 g/l), followed by drying and then calcination at 500° C. for 2 hours.

The respective catalysts of the above-mentioned Examples and Comparative examples were subjected to a duration life test under conditions indicated in Table 1. The conditions are those which simulate denitration conditions directed to coal combustion exhaust gases having arsenic suboxide generally known as one of volatile heavy metals in coal.

TABLE 1

| Item | Examples 1~10 Comp. exs. 1~9 | Examples 11~15 Comp. ex. 10 |
|---|---|---|
| Catalyst shape | 10~20 mesh | 20W × 100L − 1t |
| Quantity of catalyst | 4 ml | 3 sheets |
| Gas composition | | |
| NO | 200 ppm | |
| $NH_3$ | 240 ppm | |
| $SO_2$ | 500 ppm | |
| $CO_2$ | 12% | |
| $O_2$ | 3% | |
| $H_2O$ | 12% | |
| $As_2O_3$ | 14 ppm | |
| $N_2$ | remainder | |

TABLE 1-continued

| Item | Examples 1~10 Comp. exs. 1~9 | Examples 11~15 Comp. ex. 10 |
| --- | --- | --- |
| Gas quantity | 240 l/h | 180 l/h |
| Temperature | 350° C. | 350° C. |
| Test time | 20 h | 20 h |

Next, Table 2 shows the results of life test, the specific surface areas and the contents of sulfate group in the catalysts of Example 1 and comparative example 1.

TABLE 2

| Catalyst | Percentage denitration (%) | | Content (wt %) | | Specific surface area (m'/g) |
| --- | --- | --- | --- | --- | --- |
| | Initial | After 20 hrs. | Mo | SO$_4$ | |
| Example 1 | 98 | 92 | 4.3 | 0.3 | 60 |
| Comp. ex. 1 | 97 | 33 | 0 | 1.7 | 67 |

It is seen from the results of Table 2 that MoO$_3$ adsorption treatment makes it possible to remarkably reduce the rate of deterioration of denitration catalyst. Further, in view of the fact that the quantity of SO$_4$ in the catalyst was reduced by MoO$_3$ adsorption, it is presumed that SO$_4$ might have been replaced by MoO$_3$.

FIG. 1 shows a chart obtained by plotting the denitration performances after the life tests of Examples 2 to 6 and Comparative examples 1 to 6, relative to the mol numbers of MoO$_3$ per the catalyst surface area. It is seen from the results of FIG. 1 that the catalysts of the Examples obtained by adding MoO$_3$ and then treating the resulting material at a high temperature of 550° C. have a high denitration activity even after the life test and also a high durability. Further it is also seen that the quantity thereof added is effective within $2 \times 10^{-6}$ to $20 \times 10^{-6}$ mol/m$^2$, particularly $5 \times 10^{-6}$ to $15 \times 10^{-6}$ mol/m$^2$ per the specific surface area.

Table 3 shows the results of life test of the catalysts of Examples 7 to 10 and Comparative examples 1 and 7 to 9.

TABLE 3

| Catalyst | Composition (atomic ratio) | Percentage denitration (%) | |
| --- | --- | --- | --- |
| | | Initial | After 20 hrs. |
| Example 7 | Ti/Cu/Mo = 85/5/10 | 93 | 72 |
| Example 8 | Ti/Fe/Mo = 85/5/10 | 95 | 77 |
| Example 9 | Ti/Mn/Mo = 85/5/10 | 83 | 69 |
| Example 10 | Ti/V/W = 86/4/10 | 95 | 77 |
| Comp. ex 7 | Ti/Cu = 85/5 | 93 | 14 |
| Comp. ex 8 | Ti/Fe = 85/5 | 96 | 28 |
| Comp. ex 9 | Ti/Mn = 85/5 | 88 | 40 |
| Comp. ex 1 | Ti/V = 86/4 | 98 | 33 |

It is seen from the results of Table 3 that Cu, Fe and Mn other than V are also effective as the active component in the catalyst of the present invention.

Further, Table 4 shows the test results of Examples 11 to 15 and Comparative example 10, and this Table also shows that the catalyst of the pesent invention has a superior durability.

TABLE 4

| Catalyst | Composition (atomic ratio) | Percentage denitration (%) | |
| --- | --- | --- | --- |
| | | Initial | After 20 hrs. |
| Example 11 | Ti/Mo = 90/10 | 92 | 68 |
| Example 12 | Ti/V/Mo = 89/1/10 | 92 | 88 |
| Example 13 | Ti/V/Mo = 88/2/10 | 95 | 92 |
| Example 14 | Ti/V/Mo = 86/4/10 | 98 | 94 |
| Comp. ex 10 | Ti/V = 86/4 | 98 | 54 |

Further, with the catalyst of Example 14, steel sand of 10 to 20 meshes (8 kg) was dropped onto the respective surfaces of 100 test pieces of the catalyst tilted by 45° form the hight of 1 m to observe the abrasion at that time and thereby evaluate their strengths. As a result, it was seen that only about ⅛ of the abrasion in the case of Example 13 wherein the catalyst was not impregnated with aluminum sulfate occurred. It was confirmed that even when the catalyst was combined with a strength-improving agent as described above, deterioration of the catalyst of the present invention due to heavy metals did not increase as shown in Table 4.

The invention by which the above-mentioned second object of the present invention is achieved may be concretely carried out according to a process as described below.

In the preparation of the catalyst raw material as the above-mentioned first step, hydrated titaniums such as metatitanic acid (TiO(OH)$_2$), orthotitanic acid (Ti(OH)$_4$), etc. may be used as the titanium oxide raw material. Practically, a slurry of metatitanic acid according to sulfuric acid process may be used. Further, V, Cu, Fe and Mn as active components may be in any compound from, but oxo acid salts of ammonium metavanadate (NH$_4$VO$_3$), etc. and besides, nitrates, sulfates, etc. thereof afford good results. The quantity of these catalyst raw materials added to TiO$_2$ is preferred to be 0 to 20%, and in of catalyst activity and activity for SO$_2$ oxidation reaction as a side reaction, it is preferred to be 0.1 to 5% by atom. As to the means for mixing the both, usually a means of kneading the both on heating in the presence of water is preferably employed, but any means may be employed as far as the both can be uniformly mixed. The resulting pasty substance obtained by the mixing is molded according to extrusion-granulation process, followed by drying, calcining at 300° to 600° C. and if necessary, grinding.

MoO$_3$ used at the second step is added in 3 to 20% by weight to the catalyst raw material and the mixture is wet-kneaded by means of a kneader or the like. In this case, besides such mixing, it is preferred to vigorously mix them in a state of a low water content, in order to physically coat the catalyst particle surface with MoO$_3$. As far as this object is achieved, of course any means may be employed. Further, when fibrous materials such as ceramics wool are added and the mixture is kneaded, the catalyst strength is further improved, and when a surfactant is added, dispersibility is improved to thereby improve moldability; hence good results are obtained. As to a fabrication at this step, any process may be employed such as a process of applying the paste onto a metal substrate by means of roll to prepare a plate catalyst, a process of subjecting the paste to extrusion molding to prepare an honeycomb like catalyst, etc.

Further, in advance of the calcination at the third step, it is preferred to air-dry the fabricated material of catalyst, followed by drying on heating. As to the calcination conditions, calcination is carried out usually at 400° to 600° C. in the atmosphere. If the temperature is low, dispersing of $MoO_3$ is insufficient, while if it is high, recrystallization of thermally dispersed $MoO_3$ occurs. It is preferred to choose a range of 450° to 550° C. Since the vapor pressure of $MoO_3$ is high at such calcination temperatures, scattering of $MoO_3$ occurs somewhat, but if the calcination is carried out in a closed vessel, it is possible to prevent such scattering to thereby improve the catalyst properties.

The above steps will be described in more detail by way of the following Examples.

EXAMPLE 16

Ammonium metavanadate ($NH_4VO_3$)(0.41 kg) was added to a slurry (20 kg) containing 30% by weight of meta-titanic acid as $TiO_2$ and 2.7% by weight of sulfuric acid, followed by kneading the mixture on heating by means of a kneader to obtain a paste having a water content of 38%, granulating this paste into a granular shape of 3 mm $\phi$, drying the granules while feeding hot air at 150° C., preliminarily calcining the resulting granular catalyst in the atmosphere at 500° C. for 2 hours, and further grinding it into fine powder of 100 meshes or smaller by means of a hammer mill.

To this powder were added molybdenum trioxide ($MoO_3$, industrial grade reagent) (0.63 kg) and water (3.0 kg), followed by kneading the mixture by means of a kneader for 30 minutes, thereafter adding silica-alumina fibers (1.0 kg) and further kneading the mixture for one hour to prepare a paste for molding.

This paste was applied onto a metal lath of SUS 304 of 0.8 mm thick and 500 mm wide subjected to flame-spraying with metal aluminium, by means of a roll press so as to embed the holes of the lath, followed by air-drying it in air at 550° C. for 12 hours and calcining the resulting catalyst molded product for 2 hours. The composition of the resulting catalyst was Ti/Mo/V=91/5/4 in an atomic ratio.

EXAMPLES 17 to 19

The ratio of Ti/Mo/V in Example 16 was replaced by 94/2/4, 86/10/4 or 76/20/4 to prepare similar catalysts.

COMPARATIVE EXAMPLE 11

Addition of $MoO_3$ in Example 1 was not carried out to prepare a catalyst.

COMPARATIVE EXAMPLE 12

$MoO_3$ in Example 16 was replaced by ammonium molybdate ($3(NH_4)_2O.7MoO_3.4H_2O$)(0.77 kg) and this was directly added to a slurry of metatitanic acid, to prepare a catalyst.

EXAMPLES 20 and 21

Example 16 was repeated except that ammonium metavanadate was replaced by iron nitrate ($Fe(NO_3)_3.9H_2O$)(1.41 kg) or manganese nitrate ($Mn(NO_3)_2.6H_2O$) (1.00 kg), to prepare catalysts.

COMPARATIVE EXAMPLES 13 and 14

Addition of $MoO_3$ in Examples 20 and 21 was not carried out to prepare catalysts.

COMPARATIVE EXAMPLE 15

Example 16 was repeated except that $MoO_3$ was replaced by water-soluble ammonium molybdate (0.77 kg) to prepare a catalyst.

With the catalysts obtained in the above Examples and Comparative examples, their denitration performances and abrasion resistances were examined. The results are shown in Table 5. The denitration performances referred to herein mean those at the intial period and after the deterioration test in the case where a forced deterioration test was carried out for 50 hours under conditions of Table 6 wherein $As_2O_3$ vapor was contained in 1.4 ppm. Further, the percentage abrasion refers to the percentage reduction in the catalyst weight in the case where the catalyst was exposed into an air current (flow rate: 12 m/sec) containing a coal combustion ash (350 g/$Nm^2$) for 100 hours. As shown in Table 5, any of the catalysts of the present invention have a low percentage abrasion and also exhibit a high percentage denitration after deterioration. Whereas, in the cases of Comparative examples 11, 13 and 14 wherein no $MoO_3$ is contained, activity reduction at the time of deterioration test is notable; hence this evidences that addition of $MoO_3$ of the present invention is effective for preventing the deterioration. Further, Example 16 and Comparative example 12 are same in the composition, and nevertheless, the percentage abrasion of the former is low; this evidences that the preparation process of the present invention is a superior process in the aspect of improving the abrasion strength. It is seen from the results of Examples 16 to 19 having varied the contents of Ti and $MoO_3$ that when the content of $MoO_3$ is low, there is a tendency that reduction in the percentage denitration accompanying the deterioration increases, while when the content is too high, there is a tendency that the activity and the strength both lower. In comparison of the Examples with Comparative examples, it is seen that $MoO_3$ is effective in 2 to 20% by atom, and particularly superior specific features are exhibited in 2 to 10% by atom.

FIG. 2 shows results obtained when the catalysts obtained in Example 16 where the preliminary calcination temperature was varied were subjected to the above abrasion test. It is apparent from this FIG. 2 that the percentage abrasion is low at a preliminary calcination temperature of 300° to 600° C. and catalyst having a high strength is obtained. Thus it is indispensable for improving the abrasion strength to add $MoO_3$ after the catalyst has been subjected to preliminary calcination in advance.

Figure 3:
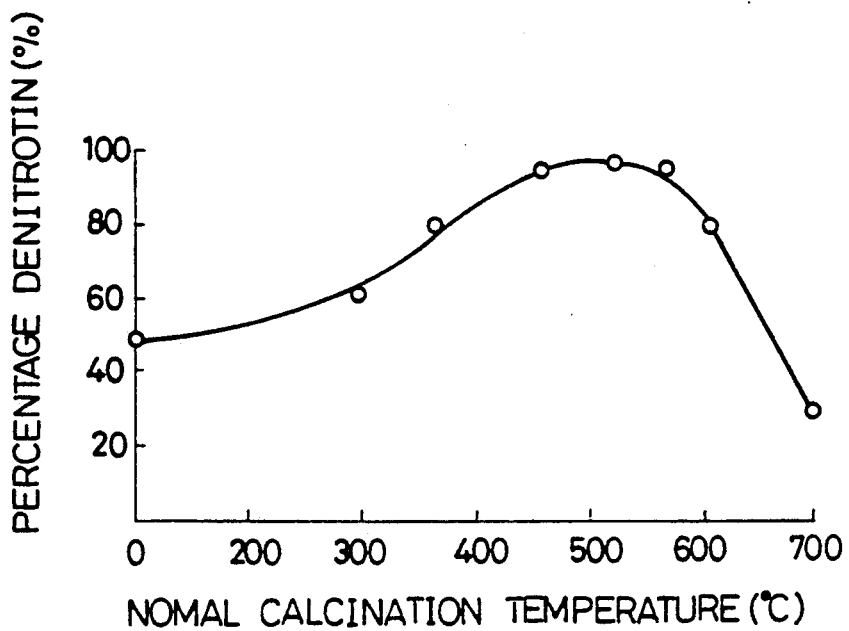
FIG. 3 shows a chart illustrating the relationship between the change in the normal calcination temperature and the percentage denitration in Example 16.
Figure 4:
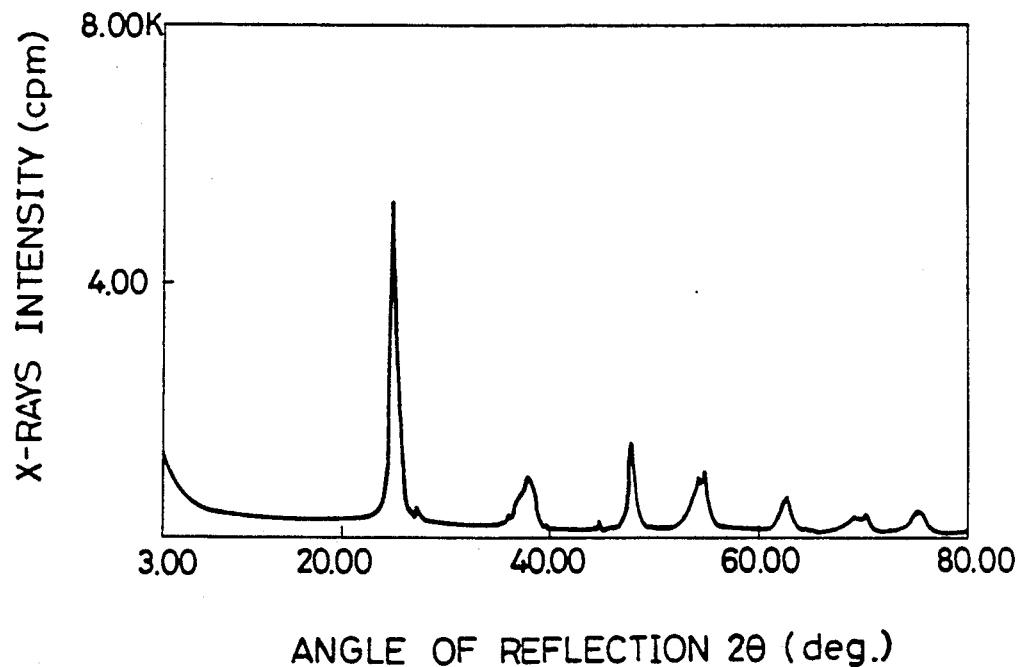
FIG. 4 shows a chart illustrating the X-ray diffraction pattern of the catalyst of Example 16.
Figure 5:
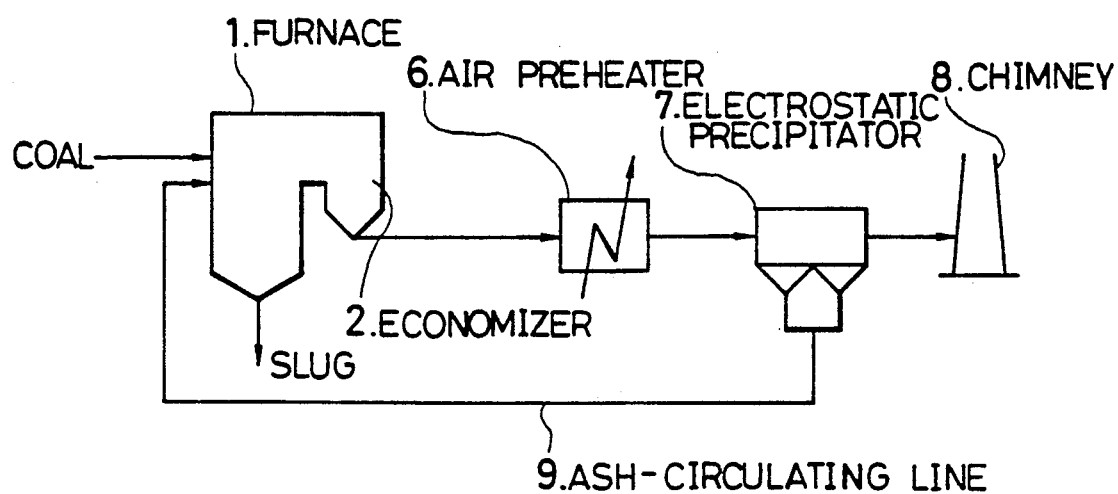
FIG. 5 shows a flow sheet of combustion system of coal provided with an ash-circulating line.

Further, FIG. 3 shows the percentages denitration before and after the catalyst deterioration test in the case where the catalyst calcination temperature in Example 16 was varied. As apparent from this FIG. 3, calcination of catalyst after addition of $MoO_3$ has a function of reducing the catalyst deterioration. As seen in the X-ray diffraction pattern of the catalyst of Example 16, a peak attributing to $MoO_3$ is not observed after calcination; hence the above function is an effect accompanying the thermal dispersing of $MoO_3$.

Further, when the results of Example 16 are compared with those of Comparative example 15 in Table 5, it is seen that in the case of Comparative example 15 using ammonium molybdate as molybdenum raw material, the percentage abrasion of catalyst notably increased. The process of using water-insoluble $MoO_3$, bringing it into a physically mixed state and then thermally dispersing it, as in the present invention, displays a notable effect of improving the strength.

As described above, the present invention is achieved by adding $MoO_3$ to a titanium oxide catalyst prepared in advance and preliminarily calcining the mixture, followed by molding and calcining the mixture.

EXAMPLE 22

The catalyst-molding process in Example 16 and Comparative example 12 was replaced by an extrusion-molding process by means of a molding machine provided with a die having a hole diameter of 10 mm $\phi$ to obtain a columnar catalyst of 10 $\phi$.

The crushing strength of the resulting catalysts in the radial direction thereof was measured by Kiya type tablet strength meter. As a result, the strength of the former catalyst was 13 kg, whereas that of the latter was 5.4 kg. Further, the surface of the molded product of the latter caused fine split, whereas the latter did not cause such a phenomenon. This is considered due to the effect of $MoO_3$ upon improving the fluidability of paste. Thus the process of the present invention is also suitable to extrusion-molding into honeycomb, cylindrical or columnar catalyst.

According to the present invention, since it is possible to retain a high denitration performance for a long time even in exhaust gases containing vapors of heavy metal compounds, it is possible to realize a denitration apparatus by the use of which the quantity of catalyst used is small. Particularly in the case of an ash-circulating boiler, since the concentration of heavy metal vapors is very high, the quantity of conventional catalysts used is calculated to be twice to three times the quantity in the case of conventional denitration apparatus, whereas in the case of the catalyst of the present invention, there are an effect that it is almost unnecessary to increase the quantity of the catalyst used, and the like effect. Further, according to the present invention, catalyst deterioration due to catalyst poisons in exhaust gases is so small that it is possible to realize an exhaust gas denitration catalyst which is small in the catalyst abrasion due to combustion ash. Further, the process of the present invention is a process having enhanced the strength and resistance to poison of catalyst according to a preparation based on the specific features of the catalyst components so that it is possible to obtain a catalyst having a superior performance through far simpler steps than those of binder addition process or the like.

TABLE 6

| Item | Conditions |
|---|---|
| Catalyst amount | 20 mm × 100 mm — 3 sheets |
| Gas amount | 3 l/min |
| Temperature | 350° C. |
| Gas composition | |
| NO | 200 ppm |
| $NH_3$ | 240 ppm |
| $SO_2$ | 500 ppm |
| $SO_3$ | 50 ppm |
| $As_2O_3$ | 14 ppm |
| $CO_2$ | 12% |
| $H_2O$ | 12% |
| $O_2$ | 3% |
| $N_2$ | remainder |

What we claim is:

1. A process for producing a catalyst for denitrating by catalytic reduction using ammonia an exhaust gas discharged from an ash-circulating boiler system in which heavy metal compounds are concentrated, the process comprising the steps of:
   mixing and kneading titanic acid or titanium oxide with a compound of metal selected from the group consisting of V, Cu, Fe and Mn in a water medium to form a resulting paste;
   drying said resulting paste;
   calcining said resulting paste to obtain a calcined material;
   grinding said calcined material to obtain a catalyst powder; and
   contacting said catalyst powder with vapor of a molybdenum compound, tungsten compound or tin compound to adsorb said compound on the catalyst powder.

2. A process for producing a catalyst for denitrating by catalytic reduction using ammonia an exhaust gas, according to claim 1, wherein said step of contacting is carried out so that said compound is adsorbed on said catalyst powder at a density of $2 \times 10^{-6}$ to $20 \times 10^{-6}$ mol/m$^2$ of surface area of said catalyst powder.

3. A process for producing a catalyst for denitrating by catalytic reduction using ammonia an exhaust gas according to claim 1, wherein the tungsten compound is tungsten oxide.

4. A process for producing a catalyst for denitrating an exhaust gas according to claim 1, wherein the tin compound is tin oxide.

5. A process for producing a catalyst for denitrating an exhaust gas according to claim 1, wherein the molybdenum compound is molybdenum oxide.

TABLE 5

| Catalyst | | Composition (atomic ratio) | Percentage denitration Initial | Percentage denitration After deterioration test | Percentage abrasion (%) |
|---|---|---|---|---|---|
| Example | 16 | Ti/Mo/V = 91/5/4 | 98 or more | 96 or more | 2.7 |
| | 17 | Ti/Mo/V = 94/2/4 | 98 | 81 | 2.5 |
| | 18 | Ti/Mo/V = 86/10/4 | 96 | 94 | 4.2 |
| | 19 | Ti/Mo/V = 76/20/4 | 93 | 92 | 8.2 |
| | 20 | Ti/Mo/Fe = 91/5/4 | 93 | 75 | 2.6 |
| | 21 | Ti/Mo/Mn = 91/5/4 | 95 | 88 | 2.7 |
| Comp. ex | 11 | Ti/V = 96/4 | 98 | 54 | 3.5 |
| | 12 | Ti/Mo/V = 91/5/4 | 98 | 94 | 17.3 |
| | 13 | Ti/Fe = 96/4 | 90 | 40 | 3.0 |
| | 14 | Ti/Mn = 96/4 | 92 | 47 | 3.1 |
| | 15 | Ti/Mo/V = 91/5/4 | 98 | 94 | 10.7 |

6. A process for producing a catalyst for denitrating by catalytic reduction using ammonia an exhaust gas according to claim 1, further comprising the steps of:
applying a paste of said catalyst powder onto a substrate to obtain a resulting catalyst; and
drying and calcining said resulting catalyst.

7. A process for producing a catalyst for denitrating by catalytic reduction using ammonia an exhaust gas discharged from an ash-circulating boiler system in which heavy metal compounds are concentrated, the process comprising the steps of:
mixing and kneading titanic acid or titanium oxide with a compound of metal selected from the group consisting of V, Cu, Fe and Mn in a water medium to form a resulting paste;
drying said resulting paste;
calcining said resulting paste to obtain a calcined material;
grinding said calcined material to obtain a catalyst powder;
mixing and kneading said catalyst powder with a molybdenum compound to coat physically the surface of the powder with said molybdenum compound;
applying a paste of said catalyst powder coated with said molybdenum compound onto a substrate to obtain a catalyst; and
drying and calcining said catalyst.

8. A process for producing a catalyst for denitrating by catalytic reduction using ammonia an exhaust gas according to claim 7, wherein said catalyst powder is mixed and kneaded with an addition of fibrous materials.

* * * * *